Patented June 15, 1926.

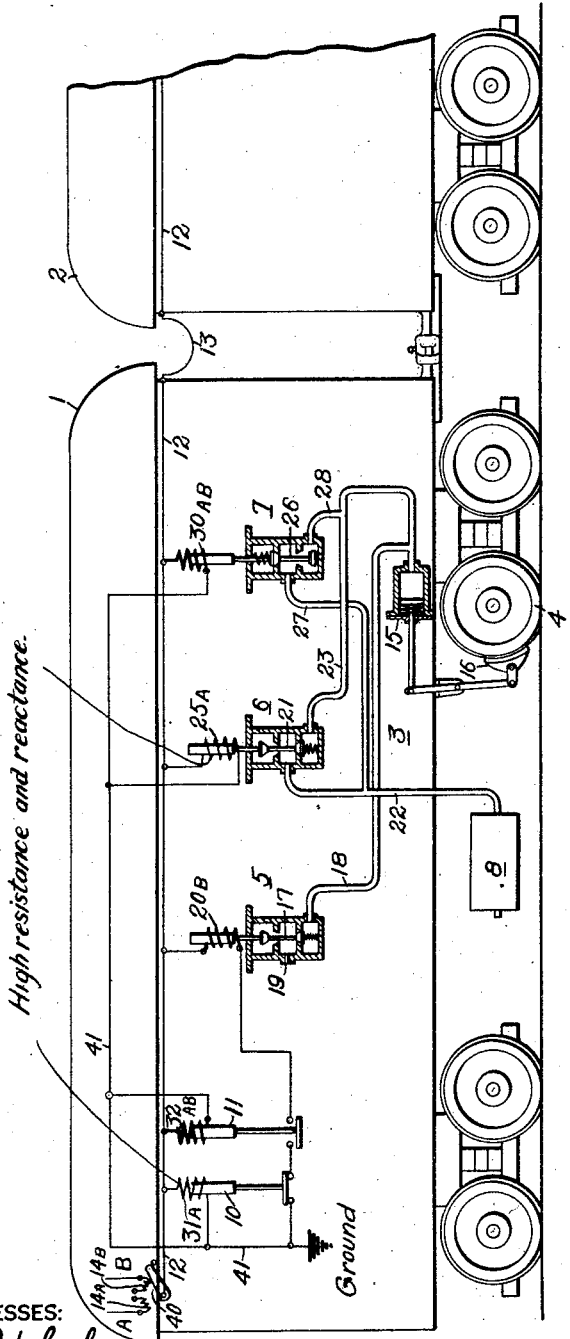

1,588,523

UNITED STATES PATENT OFFICE.

ANDREW H. CANDEE, OF PITTSBURGH, PENNSYLVANIA, ASSIGNOR TO WESTINGHOUSE ELECTRIC & MANUFACTURING COMPANY, A CORPORATION OF PENNSYLVANIA.

BRAKING SYSTEM.

Application filed April 18, 1919. Serial No. 291,094.

My invention relates to braking systems of the electro-pneumatic type, and it has for its object to provide a relatively simple braking system having certain selective features.

More specifically stated, one object of the present invention is to provide an electropneumatic braking system for a multiple-unit train requiring the use of only a single train-line wire for effecting service or emergency application of the brakes and also release thereof.

From another aspect, the object of my invention is to provide a plurality of valves respectively corresponding to service, emergency, and release operations, and a pair of relay devices operating in conjunction with a double source of supply for selectively effecting the desired braking operation through the use of a single train-line conductor.

In electro-pneumatic braking systems, three essential functions must be performed, viz, in case of failure of the electric system, the emergency application of the brakes should be automatically made, whereas, under ordinary conditions, a service application or a release of the brakes must be selectively secured.

The above objects are obtained through the use of my present invention, which may best be understood by reference to the accompanying drawing, wherein the single figure is a view, partially in elevation and partially in section, of an electro-pneumatic braking system organized in accordance with my invention.

Referring to the drawing, the apparatus shown comprises a plurality of electric railway vehicles or coaches which are generally designated by the reference characters 1 and 2, each vehicle being equipped with a suitable air-operated brake 3 for engaging one or more of the vehicle wheels 4, in accordance with a familiar practise. A suitable air-pressure reservoir 8 may be carried upon the vehicle and may be replenished by the customary electrically-driven compressor (not shown), as will be understood. According to another familiar practice, a train-line pipe is replenished from a single reservoir and compressor upon the locomotive. The latter arrangement is particularly applicable to freight cars, in conjunction with the present invention. A plurality of electro-pneumatic valves 5, 6 and 7 are employed for governing the operations of the air-brake, energy being derived from either one of a plurality of suitable sources A and B through the agency of a plurality of relay devices 10 and 11 and a single train-line conductor 12 that extends through all of the vehicles and is connected between cars by means of the familiar jumper cable 13. It will be understood that, for the sake of simplicity, only the apparatus essential to my invention is shown, although the vehicles are fully equipped with the usual forms of other apparatus. In particular, it should be noted that the familiar "straight airbrake" will usually be provided, the present invention being superimposed upon, or alternately employed with, such brake.

The air operated brake 3 may be of any familiar form and comprises essentially a brake cylinder 15 containing the customary spring-pressed piston which operates upon a brake-shoe 16 through a suitable brake-rigging.

The release valve 5 comprises a valve-stem or double plug 17 that normally occupies a position serving to prevent communication between the release pipe 18 from the brake cylinder 15 and the exhaust port 19. An actuating coil $20_B$ is provided for operating the valve-stem 17 into the opposite position, wherein fluid pressure may be released from the brake cylinder 15 through pipe 18 and exhaust port 19 to the atmosphere.

All of the actuating coils for the valves 5, 6 and 7, and the relay devices 10 and 11, have been designated with the letters A, B, or both, to indicate that the respective devices are responsive to energy from the one or the other of the sources of supply, or both.

The valve 6 is similar in character to the valve 5, comprising a stem or plug 21 that normally occupies a position to prevent access of fluid pressure from the reservoir 8 and inlet pipe 22 to the service pipe 23, which communicates directly with the brake cylinder 15. An actuating coil $25_A$ is provided for effecting communication between the inlet pipe 22 and the service pipe 23, when the coil is energized from the source of supply A.

The emergency valve 7 is of a different type from the other valves, embodying a valve-stem 26 that normally occupies the illustrated position to effect the conveyance of fluid pressure from inlet-pipe 27 through emergency pipe 28 and thence to the brake cylinder 15 whenever the actuating coil $30_{AB}$ is not energized from either of the sources of energy A or B.

The relay device 10 normally occupies its illustrated lower or closed-circuit position, for a purpose to be set forth, and is provided with an actuating coil $31_A$ for operating the relay device to its open-circuit position. The relay device 11, on the other hand, normally occupies its lower or open-circuit position and is actuated to close an auxiliary circuit when the energizing coil $32_{AB}$ is excited from either of the sources of supply.

The sources of supply A and B may be of any different character, such as 25 or 50-cycle alternating current or two different voltages of either direct or alternating current, or one source may be alternating current and the other direct current. It will be understood that the respective sets of actuating coils should be of different characteristics in order to properly function in the selective manner previously set forth. For example, the coils $31_A$ and $25_A$ may be of higher resistance and reactance than the remaining coils, as indicated by the legend in the drawing. In this way, the application of a relatively low voltage or high frequency will not effect sufficient energization of the coils $31_A$ and $25_A$ to actuate the corresponding core members. Furthermore, the sources A and B may be either entirely contained within the vehicle or may be supplied from external trolley wires or third rails by means of the usual current-collecting devices. Furthermore, in the case of freight trains, two generators, located on the locomotive, are preferably employed. In any case, the usual return circuit, Ground, is preferably utilized.

Assuming that it is desired to start the vehicle from the rest condition shown, wherein the emergency valve 7 is open to effect emergency application of the air-brakes, the source of supply B is employed by actuating a switch 40 to directly connect the source with the single train-line conductor 12. Under such conditions, the relay device 11 is lifted to its circuit-closing position by reason of the energization of the actuating coil $32_{AB}$, through a circuit including conductors 12, 41 and Ground. The other relay device 10 remains in its normal position, since its actuating coil 31 is not responsive to the character of energy that is supplied by the source B. Concurrently, another circuit is established from the train-line conductor 12 through the actuating coil $30_{AB}$ of the emergency valve 7, whence circuit is completed through the conductor 41 to Ground. In this way, the emergency valve is closed, and, in addition, another circuit is established from the train-line conductor 12 through the actuating coil $20_B$ of the release valve 5 and the contact members of the relay devices 11 and 10 to Ground. The release valve 5 is thus opened to effect the exhaust of fluid pressure from the brake cylinder 15 and, therefore, the release of the air-brakes to permit acceleration of the vehicle in any suitable manner.

When it is desired to retard the vehicle, the selective switch 40 is actuated to the position corresponding to the source of supply A, whereupon the relay devices 10 and 11 are both raised, the one to an open and the other to a closed position, and also the service valve 6 and the emergency valve 7 are actuated. The release valve remains closed, by reason of the interruption of the circuit of its actuating coil $20_B$ by the relay device 10, before the coil $20_B$ is able to actuate the release valve in opposition to the action of the spring therein.

A plurality of transition resistors $14_A$ and $14_B$ are employed for preventing the interruption of the energization of the train-line conductor 12, since such interruption during the transitional movement would automatically effect an emergency-brake application, as hereinafter more fully set forth.

Under these conditions, therefore, the emergency valve 7 is closed, while the service valve 6 is opened to admit fluid pressure from the reservoir 8 to the brake cylinder 15, the arrangement of parts being such that only a service application of the brakes is thus made.

If, at any time, it is desired to effect emergency braking of the vehicle, the master switch 40 may be actuated to its illustrated extreme position, wherein neither of the sources of energy A and B is employed. Under such conditions, the various valves and relay devices occupy the illustrated positions corresponding to an emergency application of the brakes through the agency of the open emergency valve 7. Furthermore, a similar emergency-brake application will automatically occur whenever either of the sources of supply A and B fails during the period of utilization thereof. In other words, such failure of the electrical system requires no thought upon the part of the train operator in stopping the vehicle for the sake of safety or to make the necessary repairs or substitutions.

It will be observed that the brakes upon any number of vehicles forming a multiple-unit train may be simultaneously controlled from one operating station, at the front of the leading car, for example, whereby a single train operator readily and synchronously effects the various operations of the brakes upon all of the vehicles.

In this way, I provide an electro-pneumatic braking system employing a single train-line conductor for selectively energizing or de-energizing the valves corresponding to various operations of the vehicle brake, two different sources of supply being alternatively or selectively utilized in the process.

I do not wish to be restricted to the specific circuit connections, structural details, or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a pneumatic brake, of means comprising a plurality of valves for controlling various operations of said brake, means comprising a normally open valve for effecting emergency application of said brake, and means comprising alternatively employed sources of energy and a single conductor for energizing said valve to discontinue said application and for controlling other brake operations.

2. The combination with a pneumatic brake, of means comprising a plurality of valves for controlling various operations of said brake, means comprising a normally open valve for effecting emergency application of said brake, and means comprising different sources of supply for energizing said valve to discontinue said application and for selectively controlling other brake operations.

3. The combination with a pneumatic train-brake, of a plurality of valves for respectively controlling "service," "emergency" and "release" applications of said brake, a plurality of sources of supply of different character, a plurality of dissimilar relay devices, and means for either closing the "emergency" valve and opening the "service" valve or for closing the "emergency" valve and energizing the relay devices to effect opening of the "release" valve.

4. The combination with a pneumatic train-brake, of a plurality of valves for respectively controlling "service," "emergency" and "release" applications of said brake, a plurality of sources of supply of different character, a plurality of dissimilar relay devices, and means comprising a single switch and a single train-line conductor for either closing the "emergency" valve and opening the "service" valve or for closing the "emergency" valve and energizing the relay devices to effect opening of the "release" valve.

In testimony whereof, I have hereunto subscribed my name this 2nd day of April, 1919.

ANDREW H. CANDEE.